Dec. 20, 1955  H. B. WHITE  2,727,395
FOOD MIXERS
Filed March 13, 1953  3 Sheets-Sheet 1

INVENTOR.
Harry B. White
BY Richard P. Fitzsimmons
ATTORNEY.

Dec. 20, 1955 H. B. WHITE 2,727,395
FOOD MIXERS
Filed March 13, 1953 3 Sheets-Sheet 2

INVENTOR.
Harry B. White
BY
ATTORNEY.

Dec. 20, 1955  H. B. WHITE  2,727,395
FOOD MIXERS

Filed March 13, 1953  3 Sheets-Sheet 3

INVENTOR.
Harry B. White
BY
ATTORNEY.

United States Patent Office 2,727,395
Patented Dec. 20, 1955

2,727,395
FOOD MIXERS

Harry B. White, Canton, Ohio, assignor to The Hoover Company, North Canton, Ohio, a corporation of Ohio Application March 13, 1953, Serial No. 342,145

14 Claims. (Cl. 74—16)

The present invention relates to food mixers and more particularly to an arrangement by which a plurality of power driven kitchen utensils may be driven from the same power unit and an arrangement by which the entire unit may be collapsed into a compact package for storage purposes.

According to one feature of the present invention, a mixer stand is provided to removably support a power unit in mixing position with the mixer extending downwardly into a mixing bowl mounted on the base of the stand in which the support for the power unit is foldable downwardly against the top of a pedestal or standard to reduce the height of the unit for storage purposes.

According to another feature of the present invention, the stand is provided with a gearing arrangement by which the power unit may be mounted on the base to drive the gearing which in turn drives one of a plurality of different utensils and in which the gearing arrangement includes a gear casing pivoted to the standard or pedestal proper so as to normally extend upwardly from the standard or pedestal when in a position for use and being foldable downwardly into the standard proper, to reduce the total height of the unit for storage purposes. The pivoted gear casing includes a shaft having a detachable driving connection with a driven shaft in the stand proper. When the pivoted gear casing is in use the two shafts are in driving engagement and may be disconnected to permit the pivoted gear casing to be folded downwardly into the stand proper.

According to another feature of the present invention, the stand proper is provided with a detachable support for a blender unit including a power take-off shaft for detachable connection with the shaft of the blender unit in which the blender may be attached to the stand when the pivoted gear casing is folded downwardly into the stand or when is in its extended position.

Other objects and advantages of the present invention will become apparent as the description proceeds when taken in connection with the accompanying drawings in which.

Figure 1:
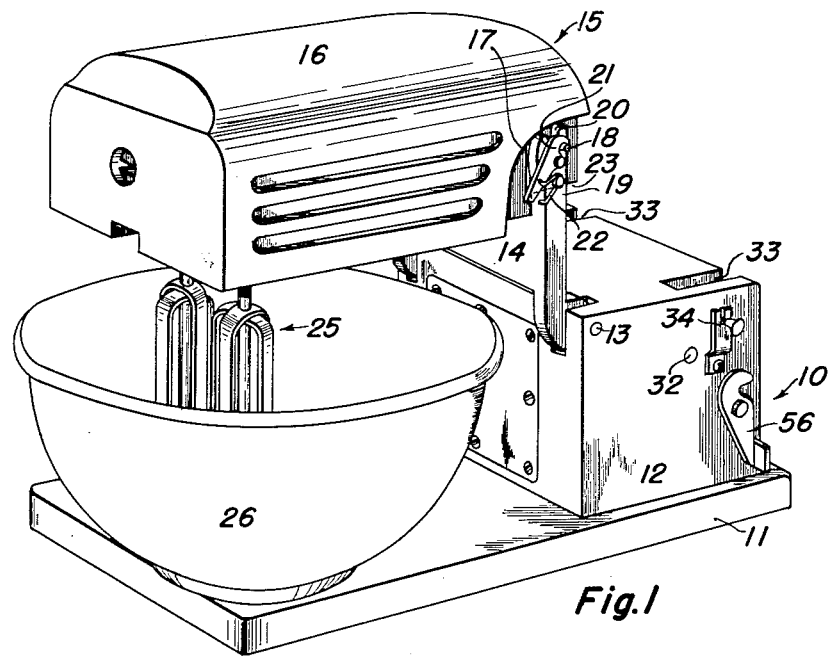
Figure 1 is a perspective view of the mixer of the present invention showing the power unit positioned for ordinary mixing operations with the pivoted supporting standard extended upwardly for supporting the power unit.

Referring to the drawings, the mixer stand of the present invention is generally indicated by the reference numeral 10. The stand 10 includes a base plate 11 and a pedestal or standard 12 extending upwardly from one end of the base plate 11.

Pivoted to the pedestal or standard 12 at 13 is a supporting arm 14 adapted to support a power unit generally indicated by the reference numeral 15 when the mixer is used for ordinary mixing purposes.

The casing 16 of the power unit 15 is recessed on each side as shown at 17 and a pair of pins 18 project outwardly from the recessed portions 17 of the casing 16. The supporting arm 14 includes a pair of upwardly extending lugs 19 having upwardly opening slots 20 for receiving the pins 18. A pair of latches 21 are pivoted to the lugs 19 and are biased to latching position by springs 22. The rear of the casing 16 is off set at 23 to cooperate with upper edge 24 of the arm 14 to hold the power unit 15 in a horizontal position as shown in Fig. 1 when the pins 18 are in slots 20 and with the recessed ends of the latches 21 engaged over the pins 18. It is to be noted that in the position shown in Fig. 1 the weight of the power unit will hold the arm 14 in its vertically extending position.

In the position shown in Fig. 1 the device is adapted for use in ordinary mixing operations. In that position the mixer elements 25 extend downwardly into a mixing bowl 26 supported on the base 11. For storage purposes the arm 14 is adapted to be folded downwardly against the top of the standard or pedestal 12 as shown in dotted lines of Figure 5.

Figure 2:
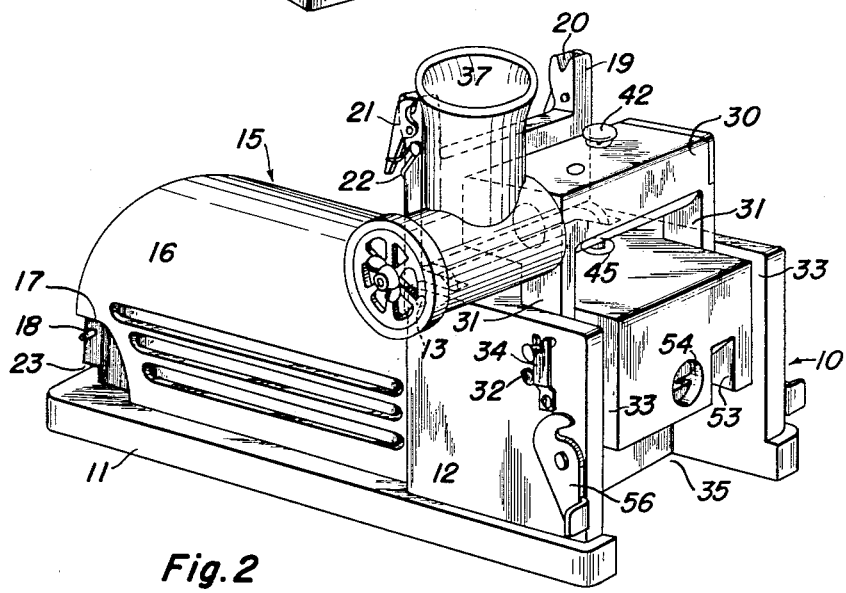
Figure 2 is another perspective view of the mixer of the present invention showing the pivoted gear casing extended upwardly into operative position and with the power unit mounted on the base and operatively connected to the gearing within the stand.
Figure 3:
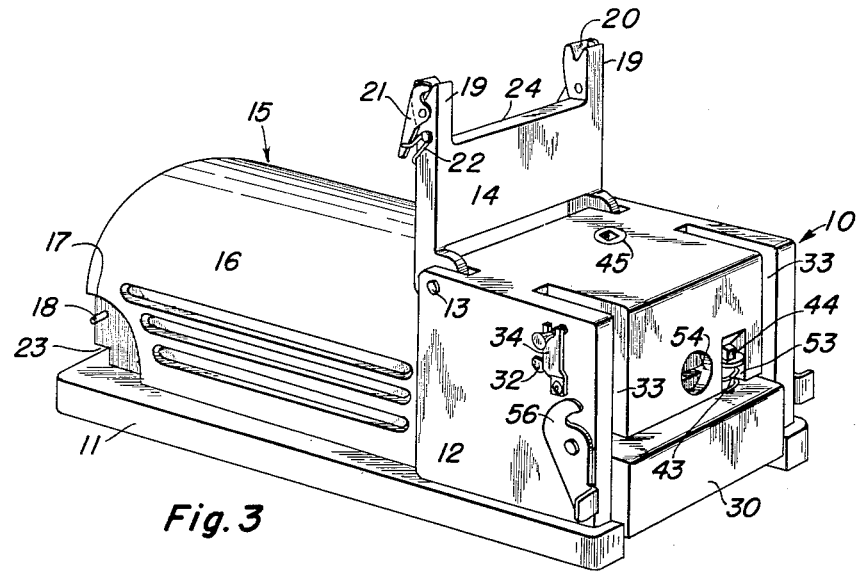
Figure 3 is another perspective view similar to that of Figure 2 showing the pivoted gear casing folded downwardly into the stand proper.

A gear casing 30 is also pivoted to the standard or pedestal 12 by means of a pair of arms 31 pivoted to the standard 12 at 32 and lying in a pair of slots 33 which open to the top of standard 12 and also to the rear face thereof. In use the gear casing 30 extends upwardly from the standard 12 as shown in Fig. 2 and is held in that position by a pair of latches 34. The gear casing 30 is adapted to be folded downwardly into the standard 12 as shown in Fig. 3. For that purpose the standard 12 is recessed at 35 below the slots 33 to receive the main body of the gear casing 30.

Figure 6:
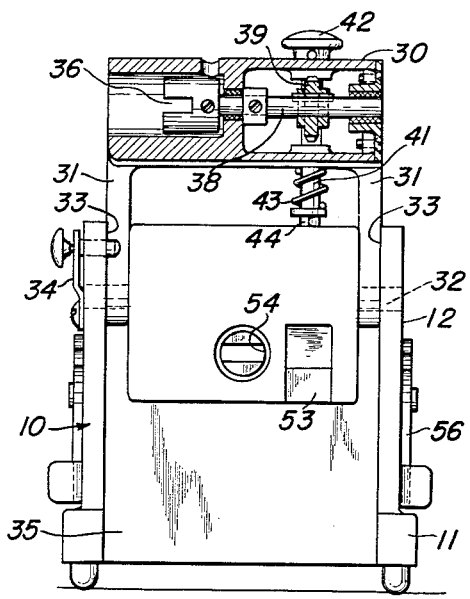
Figure 6 is a cross-sectional view taken on line 6—6 of Figure 5.

The gear casing 30 has a sidewardly facing power take-off connection 36 (Fig. 6) for detachable driving engagement with the shaft of a power driven utensil 37 as shown in Fig. 2. As shown the utensil 37 is a meat grinder but it may be a can opener, a vegetable slicer or other such utensil.

The power take-off connection 36 is on the end of a shaft 38 (Fig. 6) within the gear casing 30 and having a worm gear 39 driven by a worm 40 on a vertically extending shaft 41 rotatably mounted within the casing 30. The shaft 41 is splined to the worm 40 and is adapted to be raised upwardly by a knob 42 against the bias or spring 43 on the projecting lower end 44 of the shaft 41 as shown in Fig. 5.

The lower end 44 of shaft 41 is detachably and drivingly connected to a power take-off connection 45 facing upwardly from the top of the standard 12. The power take-off connection 45 is driven by a vertically extending shaft 46 mounted for rotation within the standard 12. The shaft 46 is driven by a worm 47 in driving engagement with a worm gear 48 on the shaft 46. The worm 47 is mounted on a horizontally extending shaft 49 mounted for rotation within the standard 12.

Figure 5:
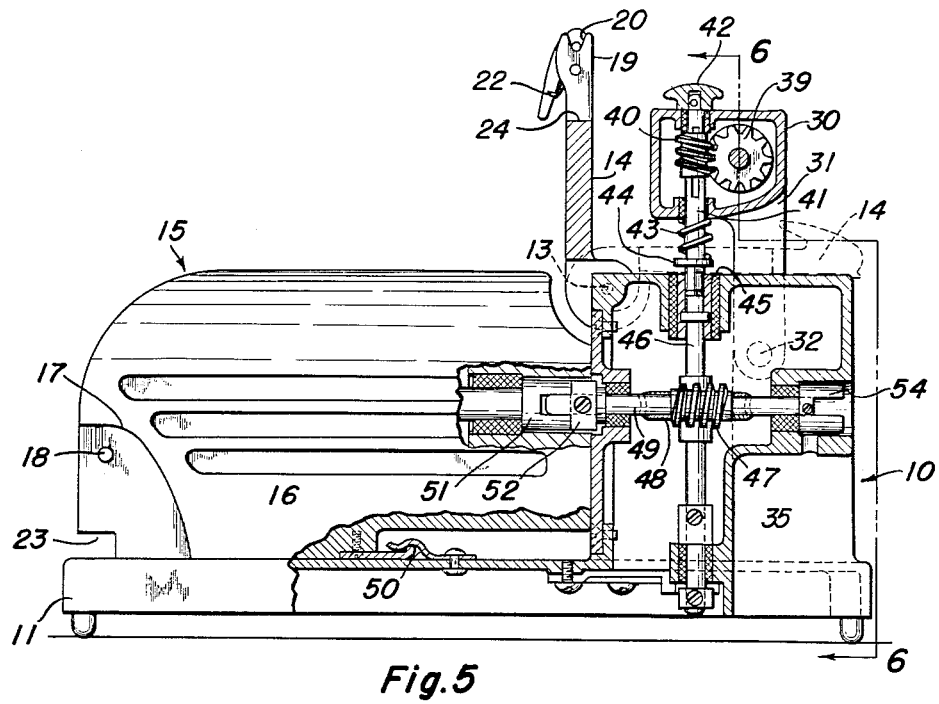
Figure 5 is a plan view of the mixer of the present invention partly in section and showing the gearing arrangement.

In the position shown in Figs. 2 and 5 the power unit 15 is mounted on the base 11 and held in that position by a latch 50 (Fig. 5). The shaft 49 is driven by a power take-off connection 51 facing forwardly from the casing 16. The power take-off connection 51 is in detachable driving engagement with a complementary power receiving connection 52 on the end of the shaft 49 and facing forwardly from the front face of the standard 12.

As previously explained the gear casing 30 is adapted to be folded downwardly into the standard 12 a recess 53 being provided above the recess 35 for receiving the lower end 44 of the shaft 41.

Figure 4:
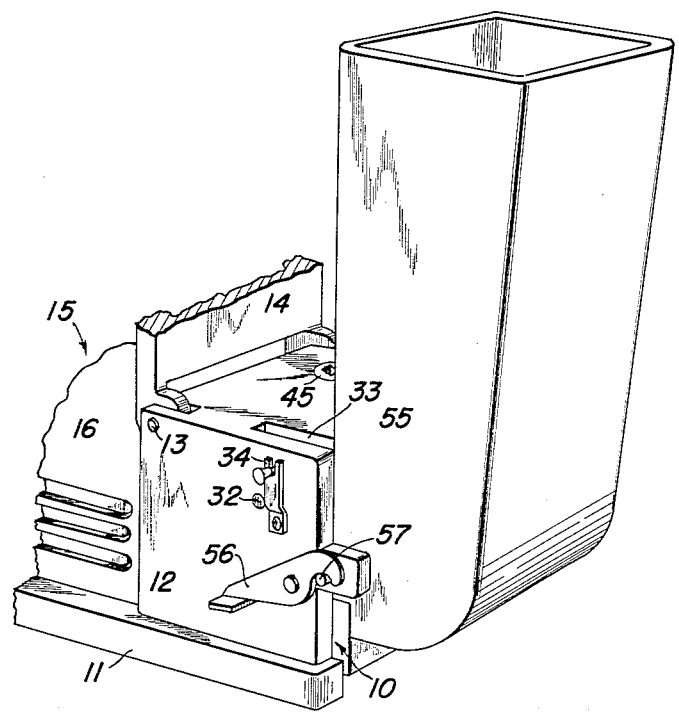
Figure 4 is a perspective view the same as that of Figure 3 but showing a blender unit mounted on the stand in operative position.

The shaft 49 is provided by the power take-off connection 54 facing rearwardly from the standard 12 and adapted to be detachably connected with the power shaft of a blender unit 55 as shown in Figure 4. The blender 55 is held against the rear of the standard 12 by means of a pair of latches 56 engaging pins 57 extending sidewardly from the blender 55. It is to be noted that the blender 55 may be operated whether the gear casing is in its folded position of Fig. 3 or in its extended position of Fig. 2. Thus the blender 55 may be operated simultaneously with the operation of the utensil 37, which may be a can opener to open cans of food to be blended. The utensil 37 may also be a vegetable slicer whereby foods to be blended may be sliced prior to the blending operation.

In moving gear casing 30 from extended position to its folded position or vice versa the knob 42 is pulled upwardly so that the end 44 of shaft 41 may be easily disengaged from or engaged with the power take-off connection 45.

From the foregoing it can be seen that the present invention provides a mixing device in which the device may be readily converted from one operation to another and in which the device may be readily collapsed into a low compact package for storage purposes.

In many present day kitchens the work board or storage space beneath the shelving of kitchen cabinets is so low in height that the present day mixers cannot be stored in that space. The mixing device of the present invention results in a solution of the storage problem while retaining all the advantages of present day mixers including ready convertibility from one type of use to the other.

While I have shown and described but a single embodiment of my invention it is to be understood that that embodiment is to be taken as illustrative only and not in a limiting sense. I do not wish to be limited to the particular structure shown and described but wish to include all equivalent variations thereof except as limited by the scope of the claims.

I claim:

1. A mixer comprising, a base, a standard rising from said base at one end thereof, a gear casing movably mounted on top of said standard, said casing being so mounted as to extend upwardly from said standard and to be movable into a collapsed position within said standard, first gearing within said casing, a power take-off connected to said first gearing for detachable connection with the driving shaft of a power driven utensil, second gearing within said standard drivingly connected to said first gearing and a power unit mounted on said base and having a power take-off detachably connected to said second gearing.

2. A mixer according to claim 1 including a manually actuatable detachable power transmitting connection between said first and second gearing.

3. A mixer according to claim 1 in which said standard is provided with a recess for receiving said casing.

4. A mixer according to claim 1 in which said second gearing is provided with a power take-off facing rearwardly from said standard for detachable driving connection with the shaft of a second power driven utensil.

5. A mixer comprising, a base, a standard rising from said base at one end thereof, a gear casing pivoted to said standard, said casing normally extending upwardly above said standard and being foldable through 180 degrees so as to lie along side of said standard, first gearing within said casing, a power take-off connected to said first gearing for detachable connection with the driving shaft of a power driven utensil, second gearing within said standard drivingly connected to said first gearing and a power unit mounted on said base and having a power take-off shaft detachably connected in driving relationship to said second gearing.

6. A mixer according to claim 5 in which said standard is formed with a recess for receiving said casing when the latter is in its folded position.

7. A mixer comprising, a base, a standard rising from said base at one end thereof, a gear casing pivoted to said standard so as to extend vertically therefrom and being foldable through 180 degrees to lie parallel with said standard, first gearing within said casing, second gearing within said standard, said second gearing including a horizontally extending rotary shaft geared to a vertically extending shaft, said horizontally extending shaft having a power connection facing the forward face of said standard and adapted to be connected to a power shaft of a power unit, said vertically extending shaft having a power take-off connection facing the upper face of said standard, said first gearing including a second vertically extending shaft geared to a second shaft within said casing having a power take-off connection for driving the power shaft of a power driven utensil and a detachable driving connection between said first and second vertical shafts.

8. A mixer according to claim 8 including manually actuatable means for connecting and disconnecting said driving connection as said casing is moved to and from its vertically extended position.

9. A mixer according to claim 7 in which said horizontally extending shaft is provided with a power take-off connection facing the rear face of said standard for detachable engagement with the shaft of the second power driven utensil.

10. A power stand comprising, a horizontally extending base portion and vertically extending pedestal extending upwardly from one end of said base portion, a gear casing pivoted to said pedestal so as to extend upwardly therefrom and being foldable downwardly to lie parallel with said pedestal, first gearing in said casing, second gearing in said pedestal, said second gearing including a forwardly facing power receiving connection facing the front of said pedestal and an upwardly facing power take-off connection facing the upper face of said pedestal, said first gearing including a power receiving connection for detachable connection with said upwardly facing power take-off connection and a power take-off connection for detachable connection with the driving shaft of a power driven utensil.

11. A power stand according to claim 10 which at second gearing includes a rearwardly facing power take-off connection facing the rear of said pedestal for detachable connection with the shaft of a second power driven utensil.

12. A power stand according to claim 10 including a supporting arm pivoted to said pedestal forwardly of said gear casing, said supporting arm being adapted to extend vertically from said pedestal in a position to support a power unit overhanging said base and being foldable backwardly against the top of said pedestal when said gear casing is in its downwardly folded position.

13. A mixer comprising, a flat horizontally extending base, a pedestal rising from one end of said base, a supporting arm pivoted to the forward edge of said pedestal so as to extend vertically from the upper face of said pedestal and being foldable downwardly against the top of said pedestal, the upper end of said supporting arm being formed to support the rear end of a power unit with its forward end overhanging the said base, said base being formed to support said power unit in storage position and said supporting arm being foldable downwardly against the top of said pedestal whereby the total height of said mixer is reduced for storage purposes.

14. A mixer according to claim 13 in which the pivotal connection between said supporting arm and said pedestal and between said supporting arm and said power unit is so formed that the weight of the power unit holds said supporting arm in its vertically extended position with the power unit extending horizontally above said base.

References Cited in the file of this patent

UNITED STATES PATENTS

| | | |
|---|---|---|
| 1,913,157 | Greist et al. | June 6, 1933 |
| 2,074,162 | Bowman | Mar. 16, 1937 |
| 2,157,683 | Vollrath | May 6, 1939 |
| 2,415,939 | Doner | Feb. 18, 1947 |
| 2,599,275 | Nelson | June 3, 1952 |
| 2,632,635 | Van Guilder | Mar. 25, 1953 |